Dec. 28, 1948.
M. R. WOLFARD
2,457,427
SPRING MEANS FOR MINIMIZING UNDULATIONS
IN SUSPENSION BRIDGES
Filed March 1, 1946
3 Sheets-Sheet 1
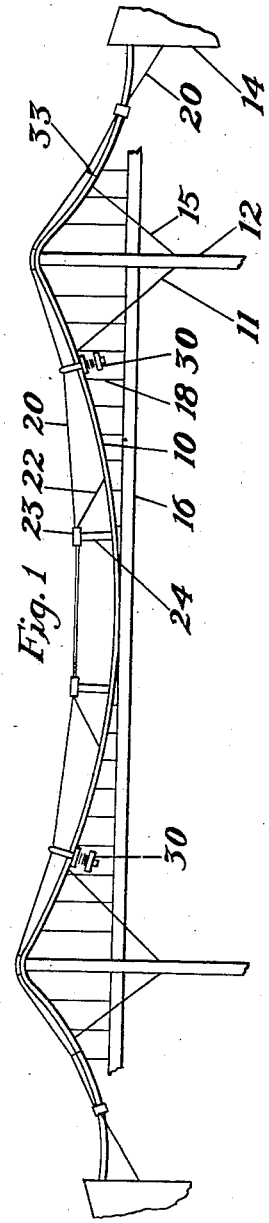
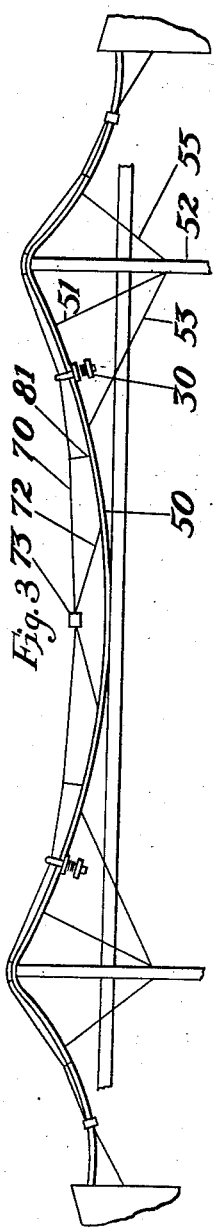
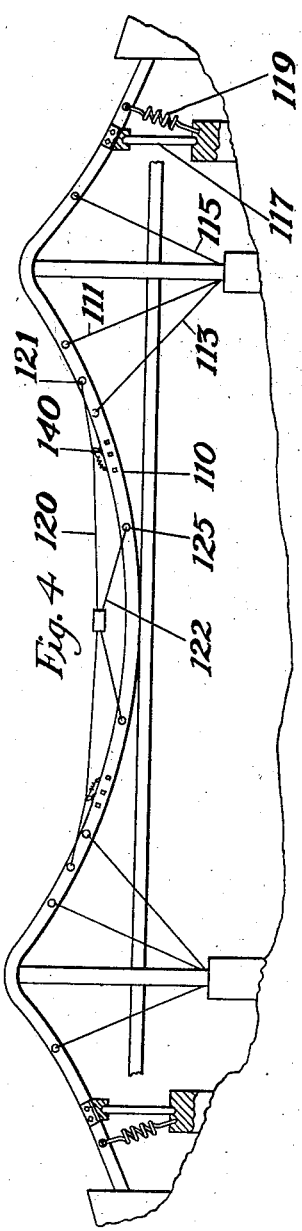
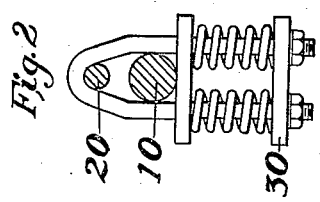
Merl R. Wolfard, INVENTOR.
BY Everett E Kent
ATTORNEY Dec. 28, 1948.	M. R. WOLFARD	2,457,427
SPRING MEANS FOR MINIMIZING UNDULATIONS
IN SUSPENSION BRIDGES
Filed March 1, 1946	3 Sheets-Sheet 2
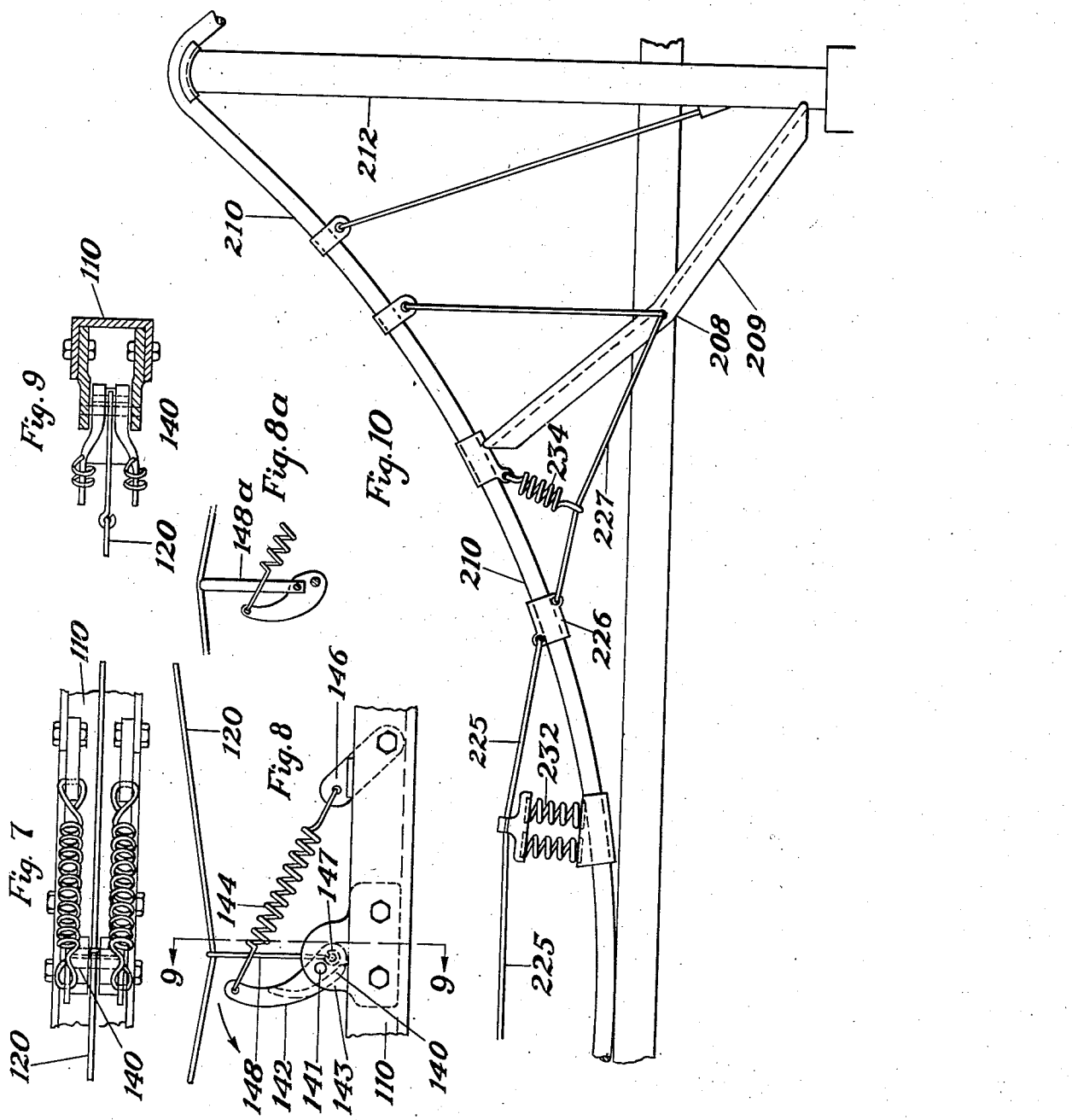
Merl R. Wolfard, INVENTOR.
BY Everett E. Kent
ATTORNEY

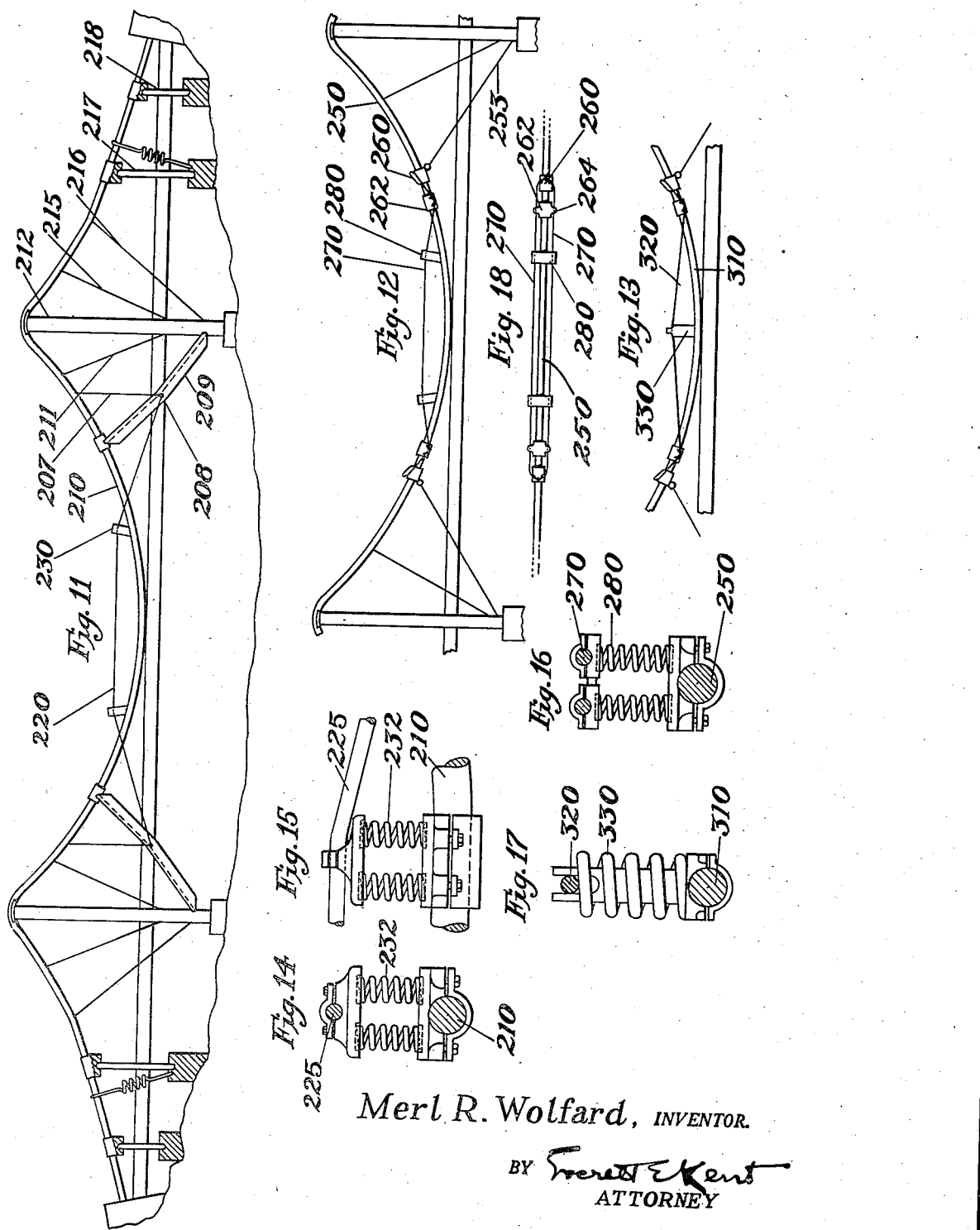

Patented Dec. 28, 1948

2,457,427

UNITED STATES PATENT OFFICE 2,457,427

SPRING MEANS FOR MINIMIZING UNDULATIONS IN SUSPENSION BRIDGES

Merl R. Wolfard, Cambridge, Mass.

Application March 1, 1946, Serial No. 651,346

5 Claims. (Cl. 14—18)

This invention relates to improvements in spring means for minimizing undulations in suspension bridges.

More particularly it relates to the stabilizing of load-sustaining elements which hang with approximately parabolic sag to sustain dead load at many points between supports, and which are subject to intermittent live loadings that tend to produce undulatory movements of those elements, such as wind and traffic tend to cause in the cables of suspension bridges.

The invention provides spring means for yieldably tensioning harness elements that restrain a principal load sustaining element at a plurality of points spaced apart from stayed points of that principal element. The yieldable harness applies forces in directions to oppose undulatory movements of that principal load sustaining element in that direction in which the movement of that element there would un-stress the adjacent stay. These stays may be either ties or struts.

A principal load-sustaining element that hangs with sag between towers to sustain loading should have a degree of resistance to bending, and the large cables required for long suspension bridges do have a very substantial resistance to localized bending. This resistance may be sufficient to resist localized deflections, resulting from live loadings, without being sufficient to prevent the longer undulatory movements which successive wind impulses and moving loads tend to produce. These longer undulations are transmitted to the bridge platform. If not arrested, they may become detrimental, and even destructive. The currently accepted method of restricting such undulations is to add a stiffening girder. Such girders are both massive and expensive. In comparison, the harness structure of this invention which minimizes such undulatory movements without the use of stiffening girders, is light and inexpensive.

The invention is particularly adapted to destroy the effect of those rhythmic variations of wind which tend to build up undulations. When heavy traffic loads are imposed on such a bridge, deflections of the principal load-sustaining elements may be permitted, because the repetitive sequence of these heavy loads is slow, as compared with the frequency of those undulations which are most troublesome in a bridge structure. The invention provides means for the prompt and positive arresting of growth of those undulatory movements which the smaller distorting forces tend to initiate, such growth being troublesome and dangerous in the principal load-sustaining elements of a suspension bridge.

Therefore it is a leading object of the present invention to restrict swaying and vibrating movements resulting from the intermittent incidence of live loadings, whether caused by winds or traffic or both, and especially to restrict the amplitude of those movements which would be aggravated by the cumulative influence of either or both of these disturbing forces.

The unique effectiveness of the structure of the invention depends upon the spring loading of harness elements, and the locations of the harness-connected points, along a load-sustaining principal element, in relation to stayed locations along that element, combined with the direction in which the harness acts to restrain initiated movements of that load-sustaining element. An important result of this elastic restraint at harness connected points is that it effectively arrests lengthwise travel of undulations, along the principal load-sustaining elements of the suspension bridge. Rhythmic deflections resulting from localized impulses do not become communicated to remote parts of the principal elements. Therefore successive gusts of wind cannot build up large undulations.

Each elastically-restrained harness-connected point along the load-sustaining element is preferably at the vicinity of a stayed point thereof, and yet is at a distance from that stayed point such that the intervening length of element will permit appreciable flexure of the element so that when this element is static it is deflected, elastically by the harness, in direction opposite to that in which it is held deflected by the adjacent stay.

In my copending application for patent Serial No. 576,394, now Patent No. 2,433,878, I point out the value of deflecting a principal load-sustaining element upward and downward at certain spaced apart points along the length of that element. In this present application I disclose an improvement comprising spring means, for elastically deflecting at least one such point in each end-half-portion of the span. When the spring means is connected to provide only one such elastically deflected point, that point of connection preferably should be toward the center of the span from that one of the inclined stays which is nearest the center of the span.

The spring may be located at or close to a stayed point of the load-sustaining element, but preferably it is at such a distance from a stayed point as will permit appreciable flexure of that element, and yet be close enough to the stayed point to prevent any large undulations of the element at that location. In any case each spring elastically applies a force at the vicinity of a stayed point, or at the vicinities of several stayed points. These points may be stayed by ties only, or by certain arrangements of both ties and struts. An arrangement of both is disclosed, which is particularly advantageous for stabilizing side spans in a suspension bridge, as well as other combinations of ties and struts which have especial characteristics.

An important feature of the invention is that the springs are supported and connected so that the harness elements, which transmit the elastic forces to the harness connected points of the principal load-sustaining element, are protected against excessive stressing. When such a harness element extends through the middle portion of the span, above the load-sustaining element, and is connected to that principal element at locations which are near the connections of the inclined stays in the end portions of the span, then changes in temperature cause those locations to move slightly away from, or toward, the tower, as the temperature rises or falls respectively. The invention provides spring loaded lever means for maintaining the tension in such a harness element approximately constant, irrespective of changes in temperatures.

It is intended to frame the appended claims so that they will particularly point out all features of patentable novelty which exist in the disclosure herein made of the employing of elastic means for the purposes stated.

The accompanying drawings, which are diagrammatic, illustrate several embodiments of the invention; but it will be understood that engineers can make various modifications within the scope of the claims.

Figure 1 is a side elevation of a suspension bridge in which the upper harness element extends from one anchorage to the other;

Figure 2 is an end elevation in cross section, through the principal load-sustaining element and the harness element showing the spring means by which they are connected, in Figure 1 and Figure 3;

Figure 3 is a side elevation of a suspension bridge in which the upper harness element extends from anchorage to anchorage, but is differently connected to the principal load-sustaining element;

Figure 4 is a side elevation of a suspension bridge in which the upper harness element extends less than the full length of the main span;

Figures 5 and 6 are cross sections of structural shapes that may be employed for the principal load-sustaining element in Figure 4;

Figures 7, 8 and 9 are respectively a plan, a side elevation, and an end elevation in section on the line 9—9 of Figure 8, rotated 90°, showing the spring means which is in Figure 4, greatly enlarged;

Figure 8a is an elevation, comparable to Figure 8, of a fragment of an alternative structure, using a push rod;

Figure 10 is a side elevation of a portion, and Figure 11 is a like elevation on a smaller scale of the full length, of nearly similar suspension bridges, in which one of the stays at each end of the span is a bent inclined strut;

Figure 12 is a side elevation of a span between towers of a suspension bridge in which the upper harness element extends less than the length of the span;

Figure 13 is a side elevation of a fragment of a bridge similar to Figure 12, differently arranged in its middle portion;

Figures 14 and 15 are respectively end and side elevations of a spring means of Figure 10 enlarged;

Figure 16 is an end elevation of an arrangement of spring means indicated in Figures 11, 12 and 18;

Figure 17 is an end elevation of spring means shown in Figure 13; and

Figure 18 is a plan of the middle portion of the structure represented in Figure 12.

In the bridge which is represented in Figure 1 each principal load-sustaining element 10, which may be a cable, extends over the towers 12 to anchorages 14. The bridge platform 16 is supported by hangers 18. In each end-third-portion of the span between towers there is a tie 11 extending from the principal element downward, at an incline, to the tower; and in each side span there is a similar inclined tie 15. An upper harness element 20 extends above the principal load-sustaining element 10; except that near the anchorages it crosses to below that element, and it is anchored below that element. There is a lower harness element 22 extending through the midportion of the span, clamped to the upper harness element 20, by two clamps 23, each at a distance from the center of the span, each end portion of this harness element 22 being inclined downward from the clamp 23 and fastened to the principal element 10. This lower harness element is tensioned to depress the upper harness element at each clamp 23, and to deflect the principal element 10 upward at each end of the harness element 22. At each clamp 23 a strut 24 is represented, which may be set there for deflecting the principal element 10 downward at the lower end of this strut. This strut may be omitted if desired.

Spring means 30 located at the vicinity of the inclined tie 11 connects the principal element 10 with the upper harness element 20 and provides a deflection in that upper harness element there. Figure 2 shows a practicable form in which this spring means 30 may be embodied for drawing elastically the harness element 20 toward the principal element 10, being a U-bolt enclosing both elements, with compression springs tending to diminish the height of the loop.

In each side span there is a short tie 33, located at the vicinity of the inclined tie 15, connecting the principal element 10 with the harness element 20 and deflecting the harness element downward there.

In Figure 3 the principal load-sustaining element is marked 50, the upper harness element 70, the lower harness element 72 and the spring means 30. The inclined tie 55 in the side spans corresponds to that marked 15 in Figure 1. In each end-third-portion of the main span there are two inclined ties 51 and 53, the latter being the further from the tower 52. The spring means 30 is located between these ties; and there is another tie 81 between the upper harness element 70 and the principal load-sustaining element 50, connected nearer the center of the span than is the tie 53, and tensioned to produce a slight deflection downward in the upper harness element 70. In this figure the lower harness element 72 is shown clamped to the upper harness element 70 at 73 at the center of the span.

In Figure 4 the principal load-sustaining element 110 is a structural channel as indicated in cross section in Figure 6. At each tower there are three inclined ties 111, 113 and 115 arranged similarly to those in Figure 3. The upper harness element 120 extends from locations 121 in the principal load-sustaining element which are between the two ties 111, 113 in each end-third-portion of the span; and its ends are held against slip relative to the principal element. The spring means, which as a whole is designated 140 and is seen in detail in Figures 7, 8 and 9, is located at the vicinity of the inclined tie 113. By the species of spring means thus shown the tension in the upper harness element 120 may be maintained substantially constant, notwithstanding that temperature or other cause changes the length of the upper tension element 120 and thus affects its degree of deflection. Any suitable fulcrum block 143 mounted on the principal load-sustaining element 110 has a lever whose power arm 142 is loaded by a tension spring 144 which is anchored at a little distance along the load-sustaining element at 146. The work arm of this lever has a link 148 extending up to the harness element 120 from the pivotal point 147 of the work arm. As portrayed, the lever is arranged and located with its fulcrum 141, power arm 142, work arm 147, and the spring anchorage 146, so that the harness element 120 is seen deflected to its lowest position—as when its temperature is highest and its length greatest. The effective work arm of the lever is relatively short. When the lever moves in the direction of the arrow in Figure 8, elongating the spring 144, the effective length of the spring power arm decreases and the effective length of the work arm increases, thus decreasing the leverage ratio. That is, the tension in the link 148 decreases as the deflection of the harness element 120 decreases, thereby tending to maintain a uniformity of tension in the harness element 120 as that element with reduction of temperature moves toward a position of less deflection. The deflecting load applied by the spring means 140 becomes diminished as the degree of deflection decreases. By this means a uniformity of tension in the harness element 120 can be approached notwithstanding changes in temperature which would cause slight movement of each end connection 121 toward and away from its nearer tower. This movement would be accompanied by a rise or fall respectively of the middle portion of the load-sustaining element 110. When the bridge structure is arranged so that it is desirable to push upward for tensioning the harness element, as in Figures 10, 11, 12, then the link 148 may be a push rod 148a, as seen in Fig. 8a.

The lower tension element 122 in Figure 4, clamped to the upper tension element 120 at the middle of the span, extends thence in each direction downward to points 125 on the principal load-sustaining element. These points 125 are each located at a distance toward the center of the span from the inclined tie 113, this distance being less than one-half of the distance from that tie to the center of the span, and yet preferably being great enough so that the spring means can cause an appreciable upward deflection in the principal load-sustaining element 110. Tension in this lower harness element deflects the mid-portion of the upper harness element 120 downward. It will be understood that in any case where a harness element requires a particular tension relative to some other structural part, conventional means for adjusting the length may be used, such as turn buckles (not shown).

In the side spans represented in Figure 4 there is a stay 117, which in this case is a strut, which rests in top bearings and bottom bearings that are rounded to permit slight movement of its upper end lengthwise of the bridge. This deflects upward the principal element 110. Preferably the length of this strut should be such that this deflection stops short of reaching the position of a straight index line (not shown) which might be drawn between the locations of the principal element at its anchorage and at its connection with the tie 115 which is between this strut and the tower. This conduces to stability and also avoids the imposing of excessive load on the strut. There may be spring tension means 119 connected to the principal element near the upper end of this strut and extending downward to an anchorage.

For the principal load-sustaining elements, in a suspension bridge, cables are preferable if the span is long, because in a long span the size required for carrying the total tension load only is sufficient to provide a satisfactory localized stiffness of the load-sustaining element, between the spaced-apart harness-restrained points. In shorter spans the size of cables required for carrying the tension load may be not sufficient to produce the desired stiffness between those points. In such shorter spans it is desirable to provide a distribution of material which produces the required resistance to bending with a minimum of weight of material. If the load-sustaining element is a channel bar, used with the channel upward as indicated in Figure 6, the required stiffness between the harness restrained points is obtained from the flanges of the channel with the use of but little material. This results because the major loading is carried by tension; and the web part of the channel, which carries the tension, is much larger than the upper edges of the flanges which carry the compression. Another means of providing this larger area for carrying tension is to use a T bar, with the stem of the T upward, as indicated in Figure 5.

In Figure 11 each side span has two ties 215, 216, and two struts 217, 218. This construction may be used when a relatively long side span is advantageous, the ties making deflections downward and the struts making deflections upward. Preferably the upward deflections at the struts do not rise above the limits indicated with reference to the struts in Figure 4. Between the towers, in each end-third portion of the span, there is a tie 211 providing downward deflection of the principal load-sustaining element 210; and, at a substantial distance from the tie 211 there is a strut 209 producing upward deflection of that element. This strut preferably is set with a bend at 208, in its middle portion, as clearly seen in Figures 11 and 10. From this set bend a tie 207 extends upward to the principal element 210. A harness element 220 extending across the center of the span has its ends fast to these struts at their bends 208. Spring means diagrammatically indicated at 230, in Figure 11, which may be of the general type 232 seen in Figures 14 and 15, or of the lever type seen in Figure 8a, supported on the principal element 210 at a distance toward the center from the strut 209, deflects the harness element 220 upward, and to a lesser degree deflects the principal load-sustaining element 210 downward.

In Figure 10 the harness element 225 is secured to the principal element 210 at 226, which is a little way toward the center from the top of the inclined strut 209; and at each end this harness element has an extension 227 from the principal element at 226 to the bend 208 in the inclined strut 209. Spring means 232 supported on the principal element near the secured ends of the harness element 225 deflect that harness element upward. Each extension 227 of this harness element has a spring 234 pulling it into an upward deflection toward the upper end of the strut 209.

The embodiment shown in Figure 12 has in each end portion of the principal element 250 a plurality of ties inclined downward to the tower, that inclined tie 253 which is nearer the center being secured to a cable band 260. The harness element 270 extends along and above the middle portion of the principal element, and its end portions reach to these cable bands 260, each being looped around a saddle groove in a cable band 260 shown in plan in Figure 18. There is another cable band 262, located far enough from the band 260 to permit of there being a flexure in the principal element between the two bands; and this band 262 has lugs 264 at each side, under which the harness element passes, thence rising and passing over spring means 280 which are preferably located at less than half way from the low point 264 to the center of the span. These lugs 264 deflect the harness element downward, and the spring means 280 deflects it upward. The end section of this harness element, between the cable bands 262 and 260, may be omitted provided the harness element is secured to the cable band 262, and provided that that band 262, or other connecting means at that location, holds the harness element 270 against lengthwise slip along the principal element 250.

The embodiment in Figure 13 is like that in Figures 12 and 18 except that there is a single upward deflection of the harness element 320 by spring means 330 located at the center of the span.

Figures 14 and 15 illustrate a type of spring means 232 which may be used for tensioning the harness element 225 as shown in Figure 10.

Figure 16 is an end view of spring means such as may be employed in the structure of Figures 12 and 18.

Figure 17 is a cross section illustrating spring means such as is represented in Figure 13.

The type of spring means which may be used is optional, various forms being shown, none of which is restricted to the particular type of bridge for the figure in which it is here seen. For example, the spring loaded lever type 140 may be substituted for the type 30 shown in Figures 1 and 3, or at any other similar location where it is desirable to obtain an optimum of control with a minimum of weight in the harness elements. The springs shown in Figures 10–13 all apply an increase in tension to the harness elements with a drop in temperature, but their flexibility may be made to be such that the increase in stress will not be excessive. The push rod type of Figure 8a may be used to reduce the push as the deflection decreases.

The bridge structures shown in Figures 10, 11 and 13 are not especially adapted for long bridges; they are more particularly applicable to shorter bridges where a light and stable structure is desired.

In all cases the spring tensioned harness provides a cushioned restraint at its points of connection to the load-sustaining element. That is, the arresting of movement is not abrupt, or jerky, as it may be when an undulating wave in the load-sustaining element meets the end of a strut, or when an undulating wave relaxes a tie, and then jerks it taut again. It is this jerky phenomenon that the invention is primarily intended to prevent, especially at that one of the inclined ties which, in each end portion of the span, is nearest to the center of the span. Thus, I believe, this invention provides a stabilization of the carrying structure of a bridge which minimizes undulations to the extent that sudden excessive stressing in any part of that structure is impossible; and, therefore, as compared with bridges as heretofore built, the bridge structure can be made lighter; the life of the bridge will be longer; and the comfort of persons riding over it will be greater.

I claim as my invention:

1. In a bridging structure, means for minimizing undulatory movements of a load-sustaining principal element—said element being anchored at its ends and supported upon intermediate towers, with a span between those towers having in each end-third-portion of the length of the span at least one stay which is fast to the principal element, inclined downward, and fast to the tower—said means comprising, in combination, a tension element extending above and along said principal element, at least through the mid-region of the span, said tension element being held at its ends against lengthwise slip relative to the principal element; and spring means engaged between said principal and tension elements for deflecting yieldably, the tension element, the yieldable force being applied against the principal element in a direction to oppose those undulatory movements of that principal element which are in a direction that would tend to unstress said stay.

2. In a bridging structure, means for minimizing undulatory movements as in claim 1, in which the spring means engages the principal element at a location which is spaced apart from a said stay, whereby when the structure is static, flexure of said principal element is produced.

3. In a bridging structure, means for minimizing undulatory movements as in claim 1, further characterized in that the spring means engages the principal element at a location which is adjacent to a said stay and is further from the tower than is that said stay.

4. In a bridging structure, means for minimizing undulatory movements as in claim 1, in which each end-third-portion of the span there is a plurality of said stays, spaced apart from each other along the principal element, and in which in each end-half-portion of the span the spring means engages the principal element at a location which is further from the nearer tower than is that one of said stays which is the more remote from that tower.

5. In a bridging structure, means for minimizing undulatory movements as in claim 1, further characterized in that the said spring means comprises a lever whose power arm is loaded by a spring, whose fulcrum is fastened to the principal element, and whose work arm is connected to the engaging means which deflects the tension element; the leverage being arranged for its ratio to decrease with that movement of the lever which attends a decrease in the deflection of the tension element.

MERL R. WOLFARD.

REFERENCES CITED

The following references are of record in the file of this patent:

UNITED STATES PATENTS

| Number | Name | Date |
|---|---|---|
| 1,132,734 | Schaake | Mar. 23, 1915 |
| 1,454,772 | Sullivan | May 8, 1923 |
| 2,062,984 | Baticle | Dec. 1, 1936 |
| 2,217,593 | London | Oct. 8, 1940 |
| 2,358,672 | Vartia | Sept. 19, 1944 |
| 2,368,907 | Whitnall | Feb. 6, 1945 |